United States Patent
Aoki

(10) Patent No.: US 11,137,604 B2
(45) Date of Patent: *Oct. 5, 2021

(54) IMAGE GENERATION DEVICE, IMAGE EXTRACTION DEVICE, IMAGE GENERATION METHOD, AND IMAGE EXTRACTION METHOD

(71) Applicant: Sony Interactive Entertainment Inc., Tokyo (JP)

(72) Inventor: Sachiyo Aoki, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 221 days.

This patent is subject to a terminal disclaimer.

(21) Appl. No.: 16/516,818

(22) Filed: Jul. 19, 2019

(65) Prior Publication Data

US 2019/0377188 A1 Dec. 12, 2019

Related U.S. Application Data

(63) Continuation of application No. 15/518,129, filed as application No. PCT/JP2015/074012 on Aug. 26, 2015, now Pat. No. 10,401,628.

(30) Foreign Application Priority Data

Oct. 24, 2014 (JP) .................. 2014-217633

(51) Int. Cl.
*G02B 27/01* (2006.01)
*H04N 13/156* (2018.01)
(Continued)

(52) U.S. Cl.
CPC ..... *G02B 27/0172* (2013.01); *G02B 27/0068* (2013.01); *G02B 27/017* (2013.01);
(Continued)

(58) Field of Classification Search
CPC ............ G02B 27/0172; G02B 27/0068; G02B 27/017; G02B 2027/0123; G02B 2027/014; G02B 2027/011
See application file for complete search history.

(56) References Cited

U.S. PATENT DOCUMENTS 6,141,034 A 10/2000 McCutchen
6,288,689 B1 * 9/2001 Shikama ............... G02B 27/017 345/7

(Continued)

FOREIGN PATENT DOCUMENTS

CN 102822787 A 12/2012
EP 2150047 A1 2/2010
(Continued)

OTHER PUBLICATIONS

International Search Report for corresponding PCT Application No. PCT/JP2015/074012, 4 pages, dated Nov. 17, 2015.
(Continued)

*Primary Examiner* — Joseph P Martinez
(74) *Attorney, Agent, or Firm* — Matthew B. Dernier, Esq.

(57) ABSTRACT

Methods and apparatus provide for: receiving an embedded image having different information embedded in an unused area of a rectangular image format for transmitting a primary image obtained by correcting beforehand an original image in a manner canceling out the distortion thereof that appears when viewed through lenses of a head-mounted display; outputting directly to a panel of the head-mounted display the embedded image received by the receiving section; and recomposing the different information by extracting the data thereof from the unused area for the embedded image.

16 Claims, 13 Drawing Sheets

(51) Int. Cl.
*H04N 13/344* (2018.01)
*H04N 13/111* (2018.01)
*G06T 5/00* (2006.01)
*H04N 7/00* (2011.01)
*H04N 7/08* (2006.01)
*G02B 27/00* (2006.01)
*H04N 5/64* (2006.01)

(52) U.S. Cl.
CPC .............. *G06T 5/006* (2013.01); *H04N 7/007* (2013.01); *H04N 7/0806* (2013.01); *H04N 13/111* (2018.05); *H04N 13/156* (2018.05); *H04N 13/344* (2018.05); *G02B 2027/011* (2013.01); *G02B 2027/014* (2013.01); *G02B 2027/0123* (2013.01); *H04N 5/64* (2013.01)

(56) References Cited

U.S. PATENT DOCUMENTS

| | | | |
|---|---|---|---|
| 10,401,628 B2 * | 9/2019 | Aoki | ............ H04N 13/111 |
| 2011/0234475 A1 | 9/2011 | Endo | |
| 2011/0239142 A1 | 9/2011 | Steeves | |
| 2013/0135435 A1 | 5/2013 | D Amato | |
| 2017/0184857 A1 | 6/2017 | Ato | |

FOREIGN PATENT DOCUMENTS

| | | |
|---|---|---|
| JP | 10327373 A | 12/1998 |
| JP | 2007298499 A | 11/2007 |
| JP | 2008216343 A | 9/2008 |
| JP | 2011152202 A | 8/2011 |
| JP | 2011203446 A | 10/2011 |
| JP | 2012085197 A | 4/2012 |
| JP | 2013539256 A | 10/2013 |

OTHER PUBLICATIONS

International Preliminary Report on Patentability and Written Opinion for corresponding PCT Application No. PCT/JP2015/074012, 13 pages, dated May 4, 2017.
Notification of Reason for Refusal for corresponding JP Application No. JP2014-21633, 11 pages, dated Apr. 3, 2018.
Extended European Search Report for corresponding EP Application No. 15852485, 8 pages, dated May 22, 2018.
Office Acton for coresponding U.S. Appl. No. 15/518,129, 7 pages, dated Jan. 11, 2019.
First Office Action for corresponding CN Application 201580056457.7, 19 pages, dated Oct. 29, 2019.

* cited by examiner

IMAGE GENERATION DEVICE, IMAGE EXTRACTION DEVICE, IMAGE GENERATION METHOD, AND IMAGE EXTRACTION METHOD

CROSS REFERENCE TO RELATED APPLICATIONS

This application is a continuation of U.S. patent application Ser. No. 15/518,129, accorded a filing date of Apr. 10, 2017 (allowed), which is a National Phase Application of PCT/JP2015/074012, filed Aug. 26, 2015, which is an international application claiming priority to JP 2014-217633, filed Oct. 24, 2014, the entire disclosures of which are hereby incorporated by reference.

TECHNICAL FIELD

The present invention relates to techniques for embedding a different image into an image destined for a head-mounted display and transferring the embedded image.

BACKGROUND ART

There have been developed systems that display a stereoscopic vision on a head-mounted display in a manner allowing the vision to reflect a line-of-sight direction of a user turning his or her head wearing the head-mounted display so that a realistic sensation for the user will be enhanced. Using the head-mounted display boosts the sense of immersion in the displayed vision and improves the user-friendliness of applications such as games.

The head-mounted display adopts optical lenses with large curvatures in order to display a vision in front of and around the user at large viewing angles. The user wearing the head-mounted display looks into a display panel through the lenses. However, the high-curvature lenses with their distortion aberration distort the image. The image is thus corrected beforehand so that it will appear undistorted when viewed through the high-curvature lenses. The corrected image is transmitted to the head-mounted display to be displayed on a liquid crystal panel and, when viewed by the user through the high-curvature lenses, appears distortion-free.

SUMMARY

Technical Problem

The image corrected as described above to minimize the distortion aberration of the lenses is still distorted when compared with an original image. Moreover, the shape of the corrected image is not rectangular but approximately circular. Under ordinary standards for image data transmission systems, images are required to be sent in a rectangular format. It follows that in the corners of a rectangular area, there occurs an unused—and therefore wasteful—area. Another problem is that the image corrected beforehand for lens distortion cannot be viewed correctly unless it is seen via the lenses of the head-mounted display. It is difficult to visually verify the image corrected for lens distortion unless the image is viewed as corrected using the head-mounted display.

It has therefore occurred to the inventors that the waste in data transmission is eliminated and user-friendliness is improved by embedding a different image into the unused area inside the rectangular area of the format for an image corrected for lens distortion and by transferring the embedded image.

The present invention has been made in view of the above circumstances. An object of the invention is to provide techniques for embedding a different image into an image destined for a head-mounted display and transferring the embedded image.

Solution to Problem

In solving the above problem and according to one embodiment of the present invention, there is provided an image generation device including: a lens distortion correcting section configured to generate a primary image by correcting beforehand an original image in a manner canceling out the distortion thereof that appears when viewed through lenses of a head-mounted display; a different image embedding section configured to generate an embedded image by embedding a different image into an unused area of a rectangular image format for transmitting the primary image; and a transmitting section configured to transfer the embedded image to the head-mounted display.

According to another embodiment of the present invention, there is provided an image extraction device including: a receiving section configured to receive an embedded image having a different image embedded in an unused area of a rectangular image format for transmitting a primary image obtained by correcting beforehand an original image in a manner canceling out the distortion thereof that appears when viewed through lenses of a head-mounted display; a display outputting section configured to output directly to a panel of the head-mounted display the embedded image received by the receiving section; and a different image recomposing section configured to recompose the different image by extracting the data thereof from the unused area for the embedded image while holding the embedded image in a memory, the different image recomposing section further writing the recomposed different image back to the memory.

According to a further embodiment of the present invention, there is provided an image generation method including: a lens distortion correcting step of generating a primary image by correcting beforehand an original image in a manner canceling out the distortion thereof that appears when viewed through lenses of a head-mounted display; and a different image embedding step of generating an embedded image by embedding a different image into an unused area of a rectangular format for transmitting the primary image.

According to an even further embodiment of the present invention, there is provided an image extraction method including: a display outputting step of outputting directly to a panel of a head-mounted display an embedded image having a different image embedded in an unused area of a rectangular format for transmitting a primary image obtained by correcting beforehand an original image in a manner canceling out the distortion thereof that appears when viewed through lenses of the head-mounted display; and a different image recomposing step of recomposing the different image by extracting the data thereof from the unused area for the embedded image while holding the embedded image in a memory, the recomposed different image being written back to the memory.

Where other combinations of the above-outlined composing elements or the above expressions of the present invention are converted between different forms such as a method, a device, a system, a computer program, a data structure, and a recording medium, they still constitute effective embodiments of this invention.

Advantageous Effects of Invention

The present invention embeds a different image into an image destined for a head-mounted display and transfers the embedded image.

DESCRIPTION OF EMBODIMENT

Figure 1:
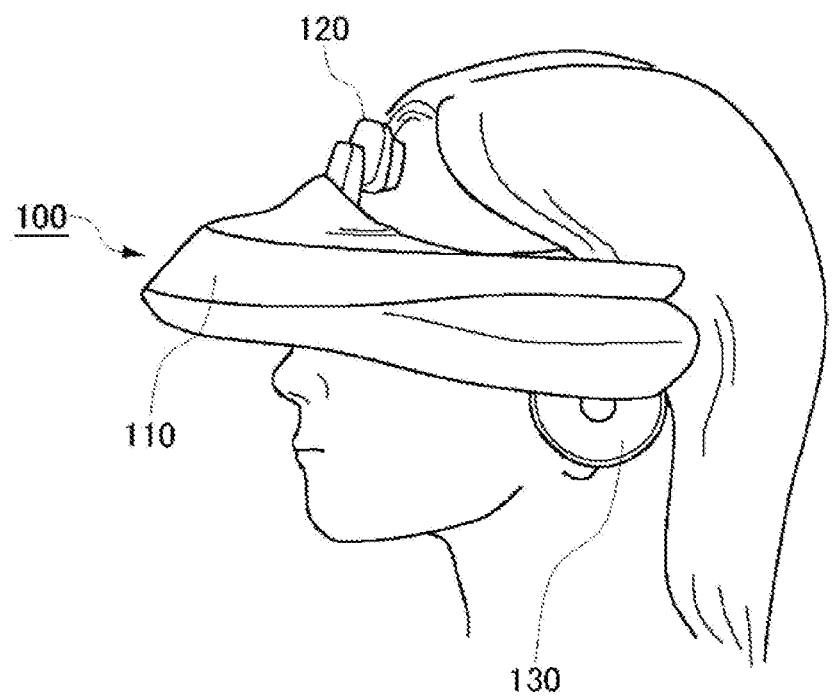
FIG. 1 is an external view of a head-mounted display.

FIG. 1 is an external view of a head-mounted display 100. The head-mounted display 100 includes a body section 110, a forehead contacting section 120, and a temple contacting section 130.

The head-mounted display 100 is a display device worn by a user on the head in such a manner that the user may view static and moving images displayed on a display while listening to the sound and music output from headphones.

An attitude sensor incorporated in or externally attached to the head-mounted display 100 permits measurement of attitude information such as the rotation angle and inclination of the user's head wearing the head-mounted display 100.

An inventive method for generating images to be displayed on the head-mounted display 100 is described below. The image generation method according to an embodiment is not limited to the head-mounted display 100 in a narrowly defined sense. This image generation method is also applicable to glasses, a glass type display, a glass type camera, headphones, a headset (headphones equipped with a microphone), earphones, earrings, an ear-hanging camera, a hat, a camera-equipped hat, or a hairband, each worn by the user.

Figure 2:
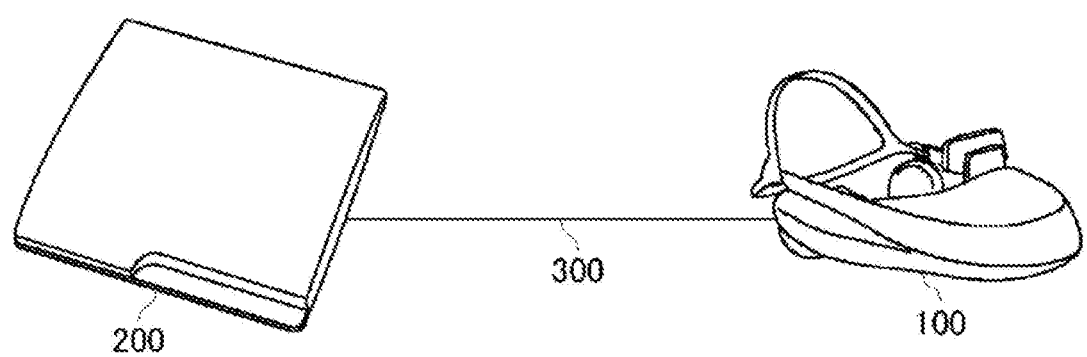
FIG. 2 is a configuration diagram of an image transfer system according to an embodiment.

FIG. 2 is a configuration diagram of an image transfer system according to the present embodiment. Typically, the head-mounted display 100 is connected to a game device 200 via an interface such as high-definition multimedia interface (HDMI; registered trademark), which is a communication interface standard for transmitting video and audio in digital signals.

The present embodiment will be explained on the assumption that a data transmission path 300 between the head-mounted display 100 and the game device 200 constitutes an HDMI transmission path. However, the communication interface between the head-mounted display 100 and the game device 200 is not limited to HDMI. Alternatively, the interface may be digital visual interface (DVI), which is a video output interface standard. The head-mounted display 100 and the game device 200 may also be connected to each other via a wireless communication interface. As another alternative, the head-mounted display 100 may be connected to the game device 200 using a peripheral connection interface such as universal serial bus (USB).

The game device 200 may be connected to a server via a network. In this case, the server may provide the game device 200 with online applications such as games in which multiple users may participate via the network. The head-mounted display 100 may be connected to a computer or a mobile terminal instead of to the game device 200.

The images to be displayed on the head-mounted display 100 may be computer graphics images such as game images in addition to images captured beforehand by cameras. The images may also be live images delivered from remote locations via the network.

Figure 3:
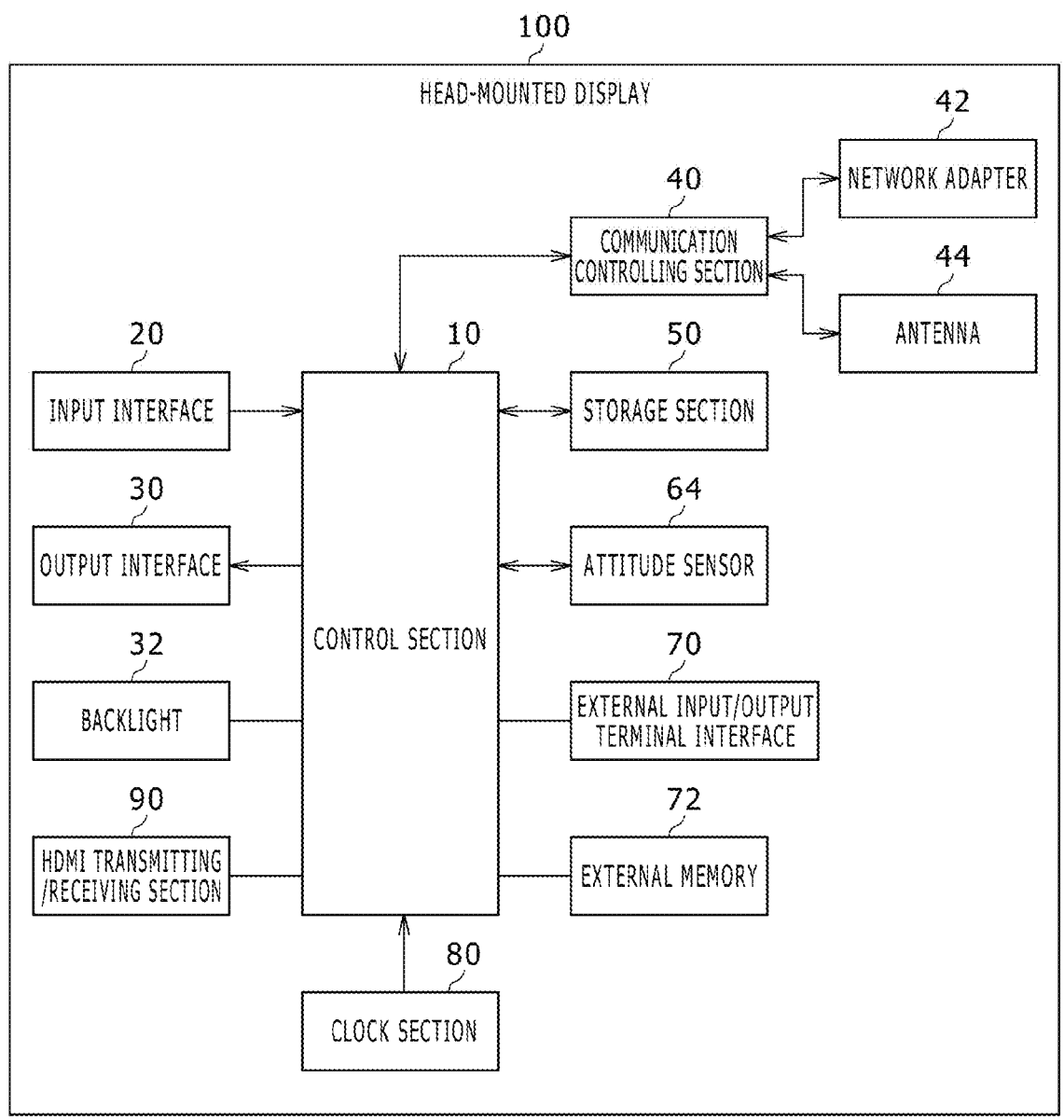
FIG. 3 is a functional block diagram of the head-mounted display.

FIG. 3 is a functional block diagram of the head-mounted display 100.

A control section 10 is a main processor that processes and outputs signals such as image and sensor signals as well as instructions and data. An input interface 20 receives operating and setting signals from the user and forwards them to the control section 10. An output interface 30 receives from the control section 10 the image signal and has it displayed on the display. A backlight 32 feeds backlight to a liquid crystal display.

A communication controlling section 40 transmits data input from the control section 10 to the outside via a network adapter 42 or an antenna 44 in wired or wireless fashion. Also, the communication controlling section 40 receives data from the outside via the network adapter 42 or antenna 44 in wired or wireless fashion and outputs the received data to the control section 10.

A storage section 50 temporarily stores data, parameters, and operating signals to be processed by the control section 10.

An attitude sensor 64 detects attitude information such as the rotation angle and inclination of the body section 110 of the head-mounted display 100. The attitude sensor 64 is implemented by suitably combining a gyro sensor, an acceleration sensor, and an angular acceleration sensor, for example.

An external input/output terminal interface 70 is an interface connected to peripheral devices such as a USB controller. An external memory 72 is an externally connected flash memory, for example.

A clock section 80 sets time information based on the setting signals from the control section 10 and feeds time data to the control section 10.

An HDMI transmitting/receiving section 90 transmits and receives video and audio digital signals in accordance with the HDMI standard.

The control section 10 feeds images and text data to the output interface 30 for display on the display, or supplies them to the communication controlling section 40 for transmission to the outside.

Figure 4:
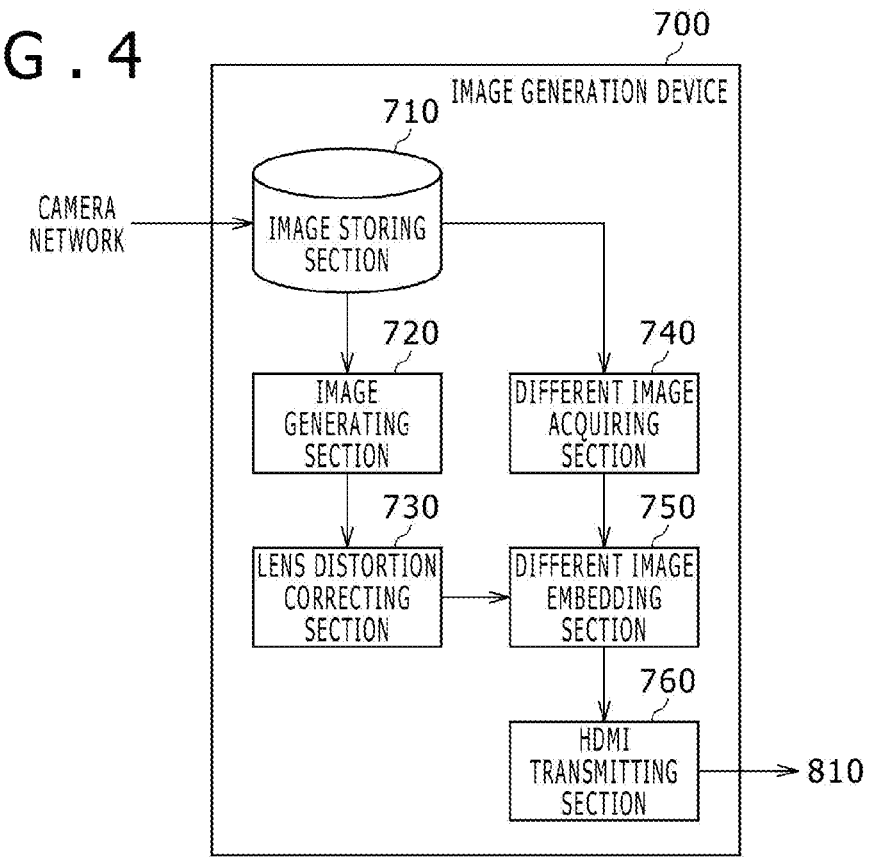
FIG. 4 is a functional block diagram of an image generation device according to the present embodiment.

FIG. 4 is a functional block diagram of an image generation device 700 according to the present embodiment. FIG. 4 depicts the blocks denoting the functions. These functional blocks may be implemented variously by hardware alone, by software alone, or by suitable combinations of both.

The image generation device 700 is mounted in the game device 200 connected with the head-mounted display 100. Alternatively, at least part of the functions of the image generation device 700 may be mounted in the head-mounted display 100. As another alternative, at least part of the functions of the image generation device 700 may be mounted in the server connected with the game device 200 via the network.

An image generating section 720 reads image data from an image storing section 710, and generates an image commensurate with the attitude of the head-mounted display 100. The image data may be previously prepared moving or still image contents or rendered computer graphics. Also, images of the outside world captured by cameras may be stored in the image storing section 710. Further, images captured at remote locations may be received via the network and stored into the image storing section 710.

A lens distortion correcting section 730 corrects beforehand the original image generated by the image generating section 720 by processing the distortion characteristics of the lenses of the head-mounted display 100 in a manner canceling out the distortion of the image as viewed through the lenses. The image having undergone the lens distortion correcting process will be called the "primary image" hereunder. The primary image is obtained by distorting beforehand the original image to cancel out the distortion aberration of the lenses in use. The primary image appears correct only when viewed through the lenses.

The primary image thus corrected for lens distortion is approximately circular in shape because of its characteristics. It follows that when the primary image is transmitted in an ordinary rectangular image format, a difference occurring between the transmitted rectangular area and the actual image area constitutes an "unused area" that has no image data. When transmitted, the unused area carries zeros or unpredictable values. In the present embodiment, a different image is embedded into this unused area for image transmission.

A different image acquiring section 740 acquires from the image storing section 710 a "different image" to be embedded into the unused area of the rectangular image format for transmitting the primary image. A different image embedding section 750 generates an embedded image by embedding the different image into the unused area of the rectangular image format. Alternatively, instead of the "different image" embedded into the unused area as in this case, "different information" may be embedded in the unused area.

An HDMI transmitting section 760 transmits to an HDMI receiving section 810 of the head-mounted display 100 an "embedded image" in which the different image is embedded in the unused area of the rectangular image format in which the primary image is stored, the transmission being performed over the HDMI transmission path.

Figure 5:
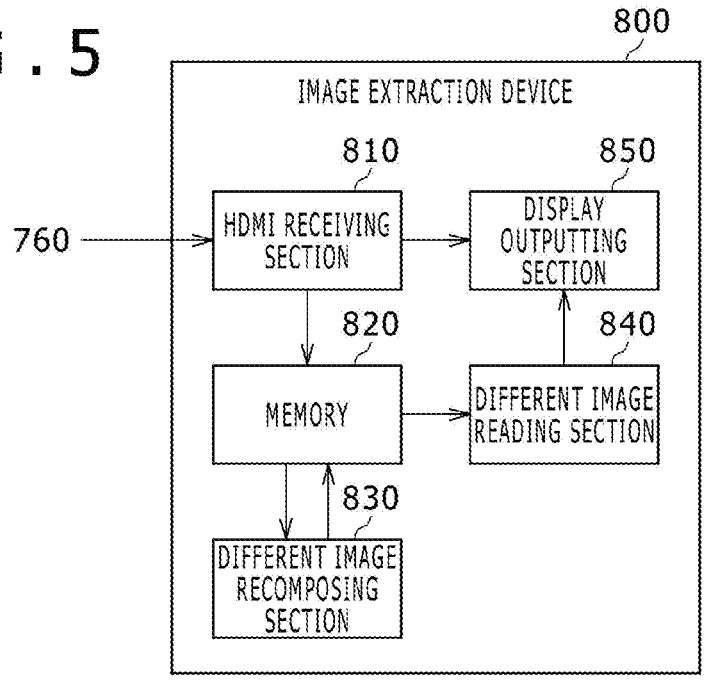
FIG. 5 is a functional block diagram of an image extraction device according to the present embodiment.

FIG. 5 is a functional block diagram of an image extraction device 800 according to the present embodiment. FIG. 5 depicts the blocks denoting the functions. These functional blocks may be implemented variously by hardware alone, by software alone, or by suitable combinations of both.

The image extraction device 800 is mounted using suitably the functional blocks of the head-mounted display 100 described above in reference to FIG. 3. For example, the functions of the image extraction device 800 may be mounted inside the HDMI transmitting/receiving section 90 of the head-mounted display 100. Alternatively, the functions of the image extraction device 800 may be mounted using the functional blocks of the HDMI transmitting/receiving section 90, control section 10, storage section 50, output interface 30, and external input/output terminal interface 70.

The HDMI receiving section 810 receives the "embedded image" having a different image embedded in the unused area of the rectangular image format in which the primary image is stored, from the HDMI transmitting section 760 of the game device 200 over the HDMI transmission path.

The embedded image received by the HDMI receiving section 810 is transferred unmodified to a display outputting section 850. In turn, the display outputting section 850 displays the embedded image on the display panel of the head-mounted display 100. In this case, the unused area for the embedded image is outside the field of view of the user wearing the head-mounted display 100. As a result, the user views only the primary image and does not see the different image.

The entire embedded image received by the HDMI receiving section 810 is temporarily stored in a memory 820. A different image recomposing section 830 successively reads the pixel data of the different image from that area of the embedded image in which the different image is embedded, and rearranges the read pixels into a rectangular image in another area of the memory 820 thereby to recompose the different image.

A different image reading section 840 reads the recomposed different image from the memory 820 and transfers the different image to the display outputting section 850. In turn, the display outputting section 850 displays the different image either on the display panel of the head-mounted display 100 or on an external display connected to the external input/output terminal interface 70 of the head-mounted display 100.

Explained above was an example in which the "different image" is embedded in the unused area. If "different information" is embedded in the unused area, the different information is similarly read out and recomposed for use with the head-mounted display 100.

Figure 6:
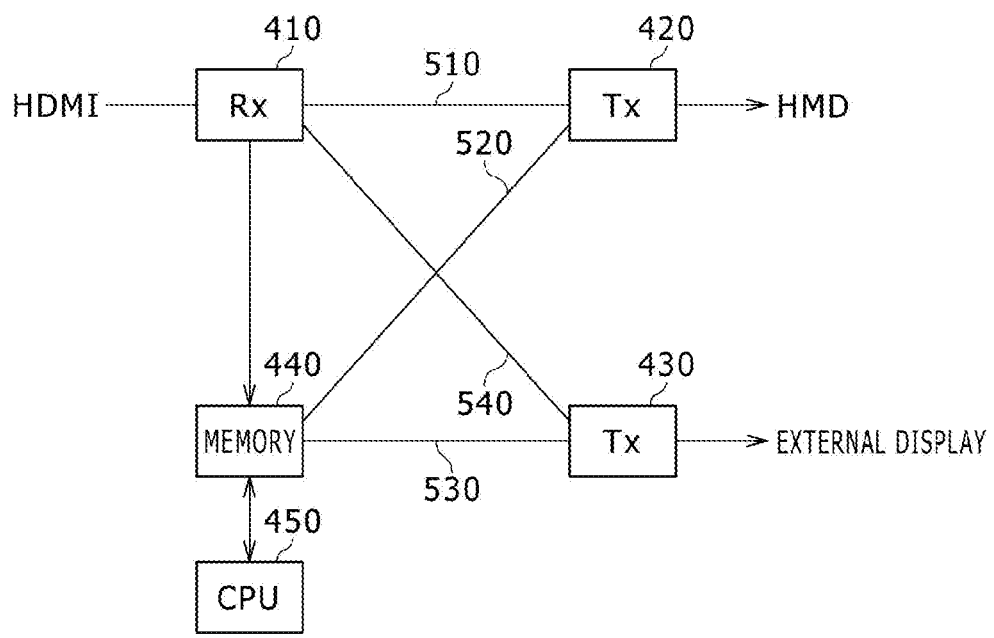
FIG. 6 is a schematic view explanatory of data transmission paths for primary and different images in the image extraction device.

FIG. 6 is a schematic view explanatory of data transmission paths for primary and different images in the image extraction device 800.

A receiver (Rx) 410 receives via HDMI a rectangular embedded image that includes the primary and different images, and transfers the rectangular embedded image unmodified to a first transmitter (Tx) 420. In turn, the first transmitter 420 outputs the embedded image to the display panel of the head-mounted display 100 (path 510). In this case, when the embedded image is output to the display panel of the head-mounted display 100, an originally dark area (unused area) surrounding the primary image is not seen by the user because the dark area is outside the field of view of the head-mounted display 100.

As described above, the primary image data is not retrieved from the rectangular embedded image. Instead, the entire embedded image is output to the head-mounted display 100. The unused dark area surrounding the primary image is originally outside the field of view, so that the user views only the primary image. That means there is no need to read the primary image data from the embedded image and store the read data into a memory. Instead, the whole embedded image including the primary image is transferred from the receiver (Rx) 410 directly to the first transmitter (Tx) 420 without the intervention of the memory. In turn, the first transmitter (Tx) 420 outputs the entire embedded image to the panel of the head-mounted display 100. Thus there occurs no latency attributable to writing or reading of data to or from the memory when the primary image is displayed.

Meanwhile, the receiver (Rx) 410 stores into a memory 440 the entire embedded image (primary and different images) received via HDMI. A central processing unit (CPU) 450 reads the pixel data of the different image from the embedded image held in the memory 440, recomposes the read data into a rectangular different image, and writes the recomposed image back to the memory 440. A second transmitter (Tx) 430 reads the recomposed different image from the memory 440 and outputs the different image to a display external to the head-mounted display 100 (path 530). At this point, it is to be noted that while the image of the entire area in the rectangular image format is stored in the memory 440, only the different image data is read from the whole rectangular image area by the CPU 450. That is because the primary image data is transferred directly to the first transmitter (Tx) 420 without the intervention of the memory 440 as described above.

As explained above, the primary image received via HDMI is output unmodified to the display panel of the head-mounted display 100 (path 510). Meanwhile, the embedded image including the different image is held in the memory 440. The different image is recomposed by the CPU 450 before being output to the external display (path 530). For example, if the different image is a primary image yet to be corrected for distortion, i.e., if the different image is the original image, the image seen through the lenses by the user wearing the head-mounted display 100 can be verified as the different image using the external display.

Over an alternative transmission path, the first transmitter 420 may read from the memory 440 the different image recomposed and written back thereto, and output the different image to the display panel of the head-mounted display 100 (path 520). For example, if the primary image is a game image or a movie and if the different image is an image captured of the real space by a camera, the different image may be displayed on the head-mounted display 100 that may be used as a transparent head-mounted display. In this case, the primary image and the different image may be arranged to be switched therebetween.

The receiver 410 may transfer the primary image unmodified to the second transmitter 430. In turn, the second transmitter 430 may output the primary image to the external display (path 540). This transmission path may be utilized where the external display is desired to be used to verify the image to be transferred to the head-mounted display 100 or where the primary and different images are desired to be viewed in mixture using the external display.

Figure 7:
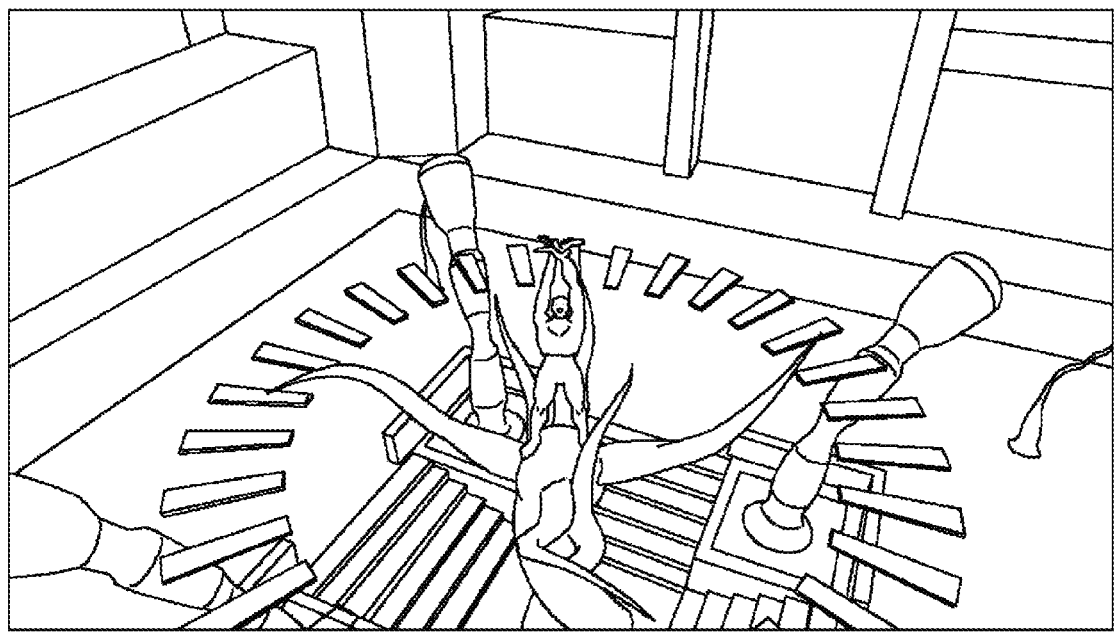
FIG. 7 is a schematic view showing a typical original image to be displayed on the head-mounted display.

FIG. 7 is a schematic view showing a typical original image to be displayed on the head-mounted display 100. This original image is generated by the image generating section 720 of the image generation device 700.

Figure 8:
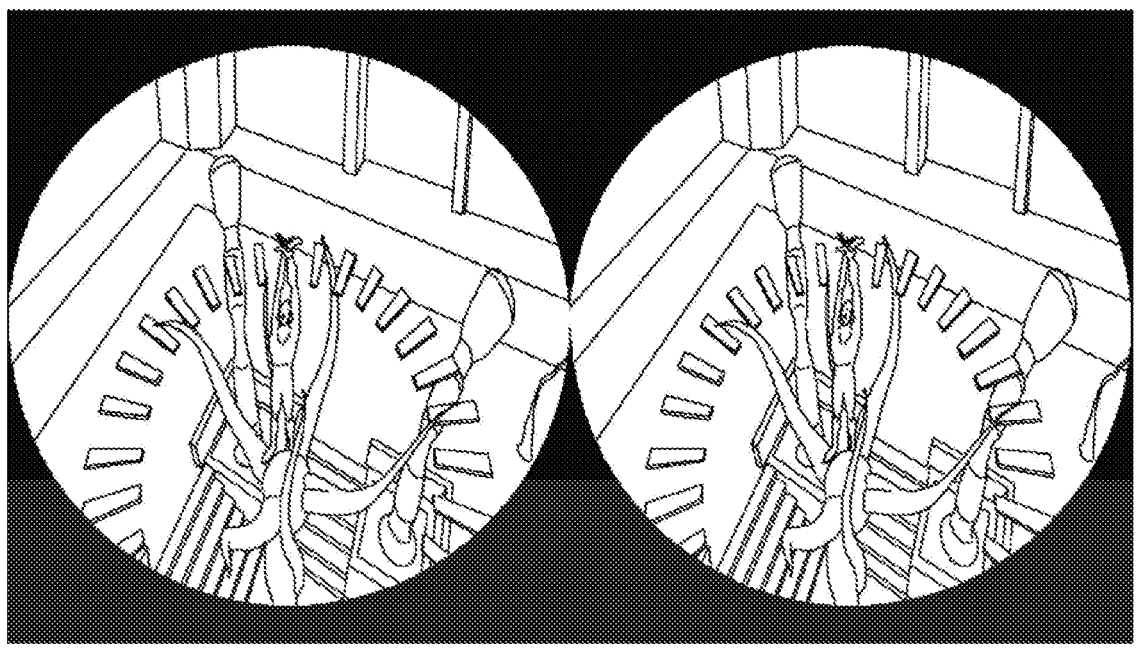
FIG. 8 is a schematic view showing a typical primary image that is corrected for lens distortion.

FIG. 8 is a schematic view showing a typical primary image that is corrected for lens distortion. The primary image corrected for lens distortion is generated by the lens distortion correcting section 730. This is an example in which a left-eye image and a right-eye image are provided for stereoscopic display.

Compared with the original image in FIG. 7, the primary image in FIG. 8 is considerably distorted and appears approximately circular as a result of being corrected to rectify the distortion characteristics of the lenses. The dark area surrounding the primary image is not used as an effective field of view on the head-mounted display 100. As a result, when the primary image is transmitted in the rectangular image format, the dark area constitutes an unused area.

The image corrected for lens distortion as shown in FIG. 8 is seen correctly as the original image in FIG. 7 when viewed through the lenses of the head-mounted display 100. When viewed by someone not wearing the head-mounted display 100, however, the corrected image is too distorted to be verified for its content. Thus when multiple users wish to view the same image simultaneously or when friends want to play games between them, only the user wearing a single head-mounted display 100 available on site can enjoy the image or the game screen. Where a child wearing the head-mounted display 100 plays a game or watches a movie, his or her parents cannot verify the content of the image and are unable to guide the child as needed.

Meanwhile, where an original image not corrected for lens distortion (or an original image with reduced resolution) is embedded in the unused area and transferred as a different image, the users not wearing the head-mounted display 100 can view the image or the game screen in the form of the different image.

Figure 9A:
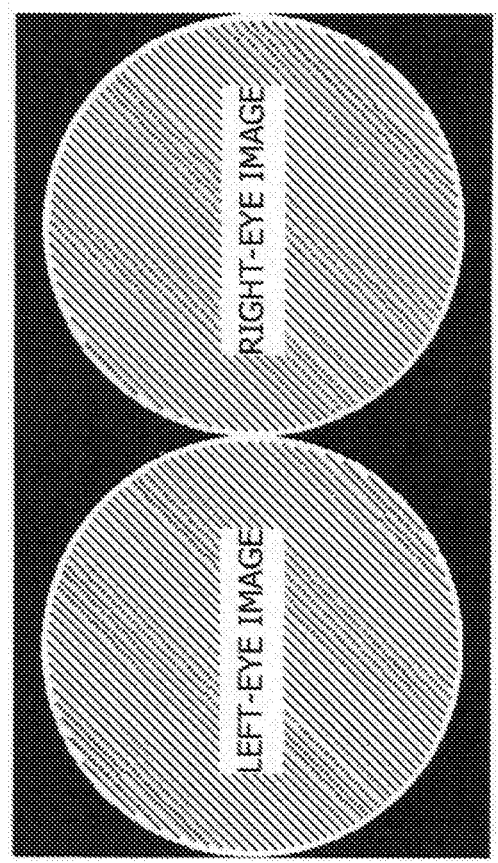
FIGS. 9(a), 9(b), and 9(c) are schematic views explanatory of a primary image for stereoscopic display, the image being transmitted in a rectangular image format.
Figure 9C:
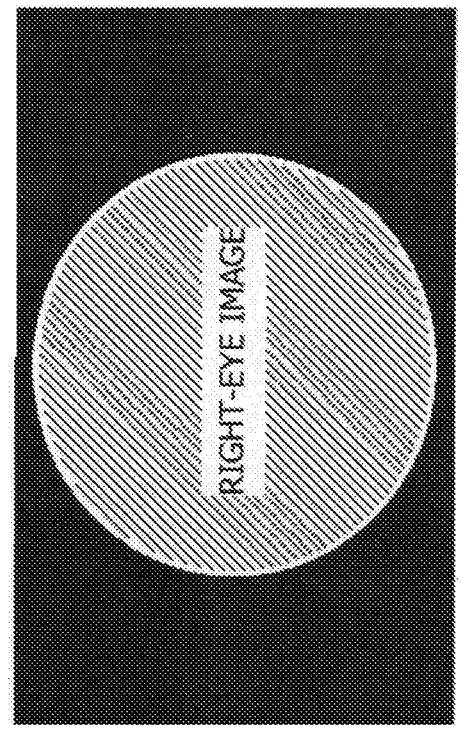
Figure 9B:
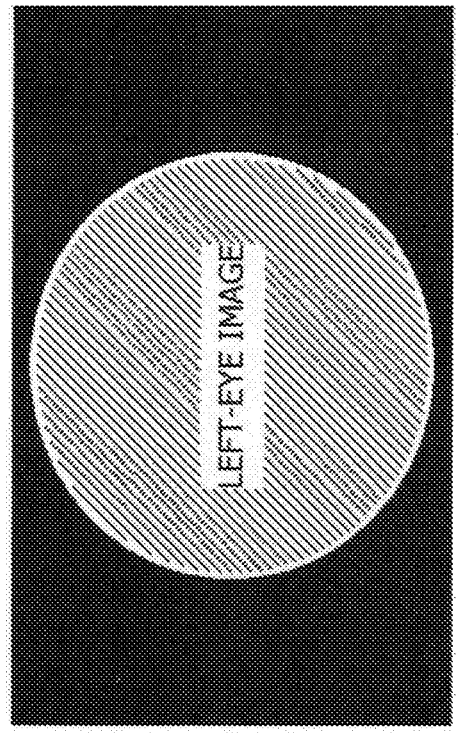

FIGS. 9(a) to 9(c) are schematic views explanatory of a primary image destined for stereoscopic display and transmitted in the rectangular image format.

FIG. 9(a) shows the case in which a left-eye image and a right-eye image are transmitted as a single rectangular image. The dark area constitutes the unused area.

FIGS. 9(b) and 9(c) depict cases in which the left-eye image and right-eye image are transmitted as different rectangular images. In each rectangular image, the dark area constitutes the unused area.

Described below is the method for embedding and extracting a different image to and from the unused area using, for example, the format for transmitting the left-eye image and right-eye image as one rectangular image. However, this transmission format is not limitative of the present invention. The left-eye and right-eye images may be switched in their positions. The primary image area is not limited to being circular in shape. In any case, whenever the primary image does not fit precisely in the rectangular area for use in image transfer, the gap (unused portion) between the image and the area is utilized as the unused area in which to embed the different image.

Figure 10:
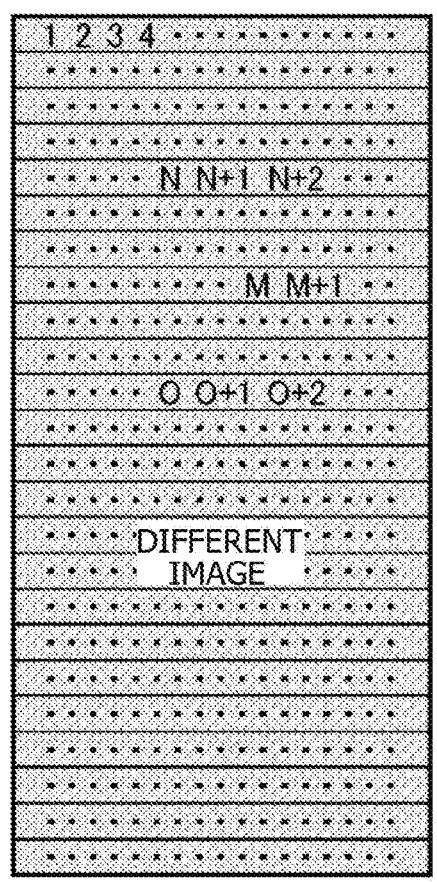
FIG. 10 is a schematic view explanatory of the different image to be embedded in an unused area.

FIG. 10 is a schematic view explanatory of the different image to be embedded in the unused area. FIG. 10 shows the numbered pixels of the different image (1, 2, 3, 4, . . . , N, N+1, N+2, . . . , M, M+1, . . . , O, O+1, O+2).

Figure 11:
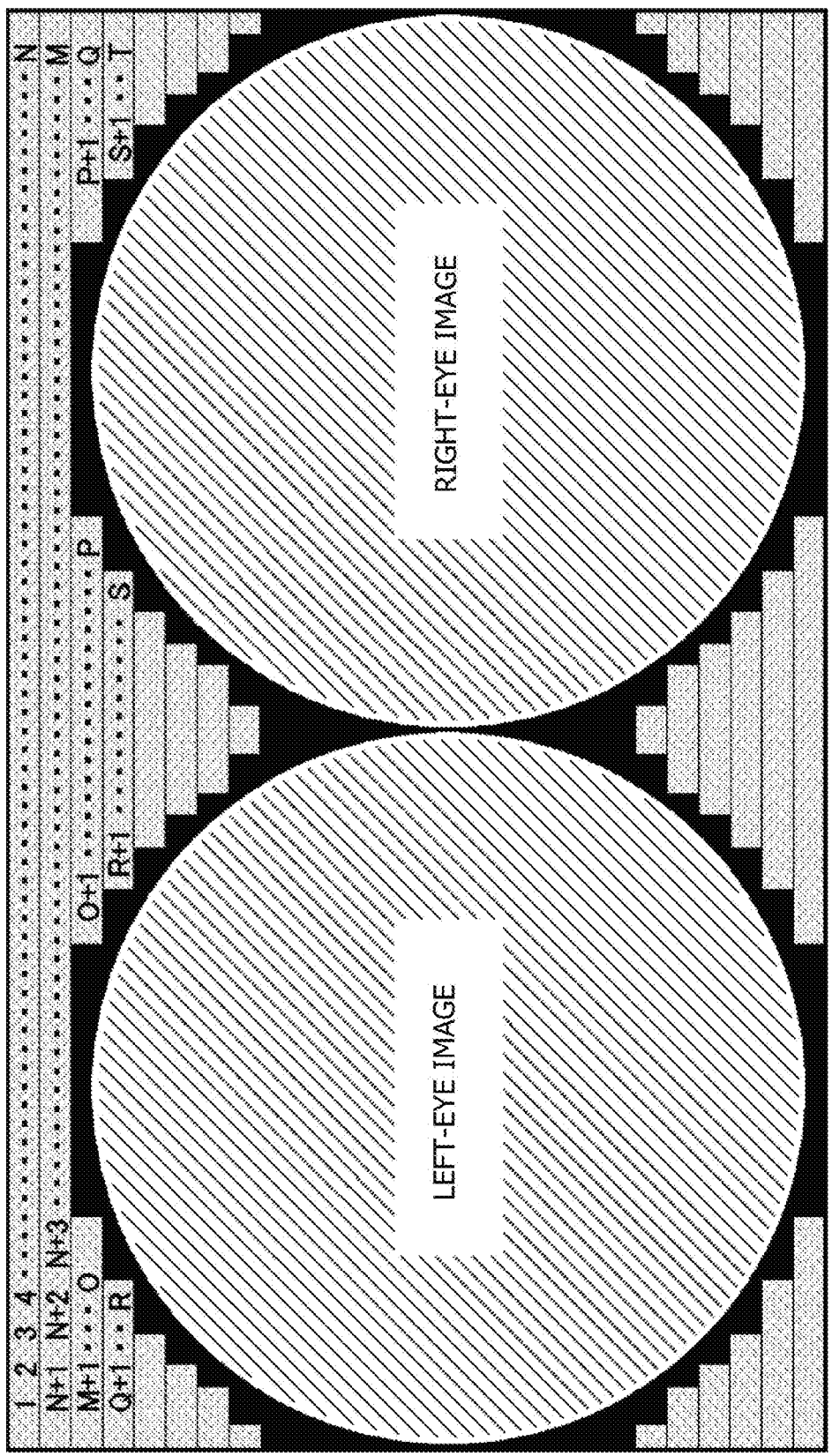
FIG. 11 is a schematic view showing how the pixels of the different image are embedded in the unused area of the rectangular image format for transmitting the primary image.

FIG. 11 is a schematic view showing how the pixels of the different image are embedded in the unused area of the rectangular image format for transmitting the primary image. The pixels numbered "1, 2, 3, 4, . . . , N" of the different image are disposed in a first row of the dark unused area; the pixels numbered "N+1, N+2, . . . , M" of the different image are disposed in a second row of the unused area; the pixels numbered "M+1, . . . , O, O+1, . . . , P, P+1, . . . , Q" of the different image are disposed in a third row of the unused area; and the pixels numbered "Q+1, . . . , R, R+1, . . . , S, S+1, . . . , T" of the different image are disposed in a fourth row of the unused area. In this manner, the unused area is filled with the pixels of the different image successively from the top left to the bottom right.

Figure 12:
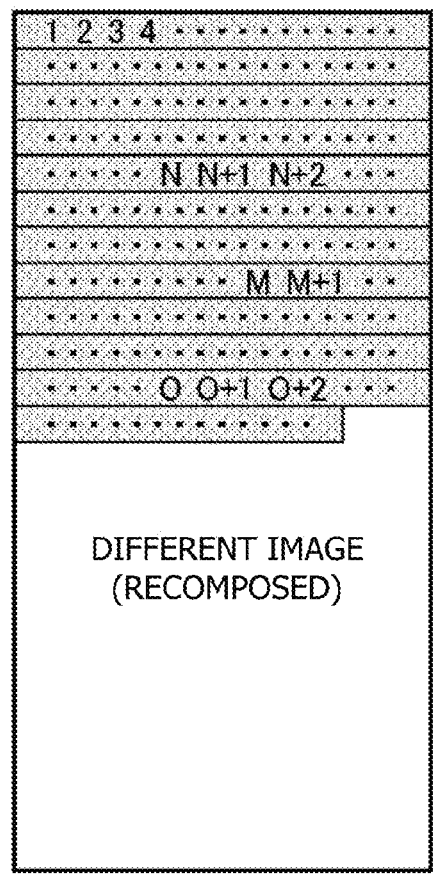
FIG. 12 is a schematic view explanatory of how the different image is recomposed in units of pixels.

FIG. 12 is a schematic view explanatory of how the different image is recomposed in units of pixels. The pixels of the different image are read successively from the unused area of the rectangular image format shown in FIG. 11 and are rearranged into a rectangular area. This allows the different image to be recomposed in the memory as shown in FIG. 12.

Figure 13:
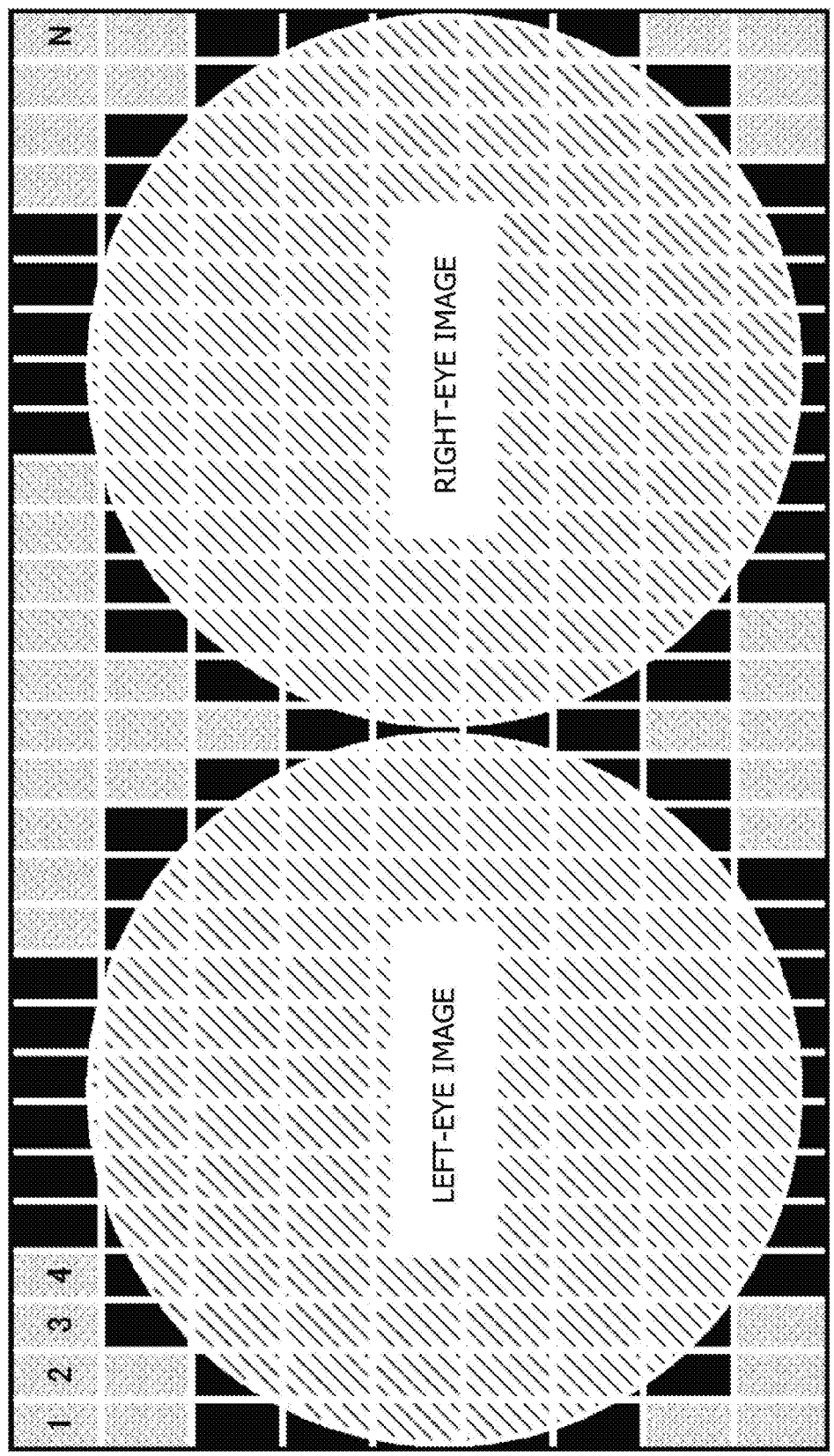
FIG. 13 is a schematic view showing how the pixel blocks of the different image are embedded in the unused area of the rectangular image format for transmitting the primary image.

FIG. 13 is a schematic view showing how the pixel blocks of the different image are embedded in the unused area of the rectangular image format for transmitting the primary image. The rectangular image format is divided into pixel blocks of a predetermined size each. These pixel blocks fall into three categories: some have all their pixels used by the primary image (filled with a left-eye image and a right-eye image); some have part of their pixels used by the primary image; and some have none of their pixels used by the primary image. The pixel blocks located in the unused area and having none of their pixels used by the primary image are utilized as the blocks in which to embed the pixel blocks of the different image. The pixel blocks numbered "1, 2, 3, 4, . . . , N" of the different image are embedded in the first row.

Figure 14:
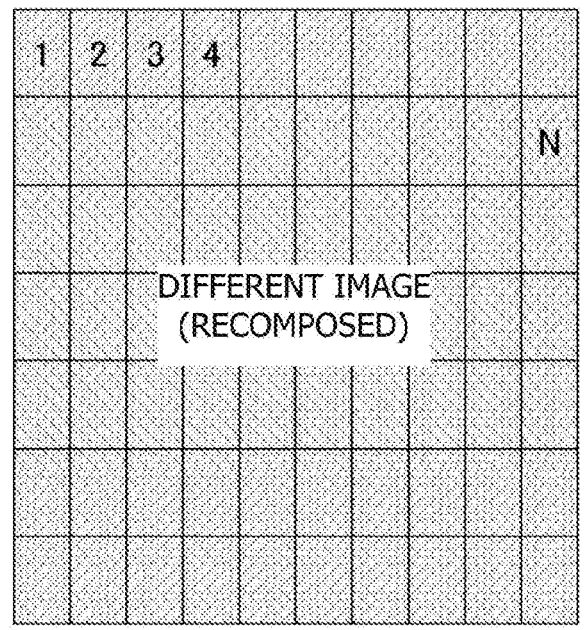
FIG. 14 is another schematic view explanatory of how the different image is recomposed in units of pixel blocks.

FIG. 14 is another schematic view explanatory of how the different image is recomposed in units of pixel blocks. The pixels of the different image are read successively from the unused blocks of the rectangular image format shown in FIG. 13 and are rearranged into a rectangular area. This allows the different image to be recomposed in the memory as shown in FIG. 14.

Figure 15:
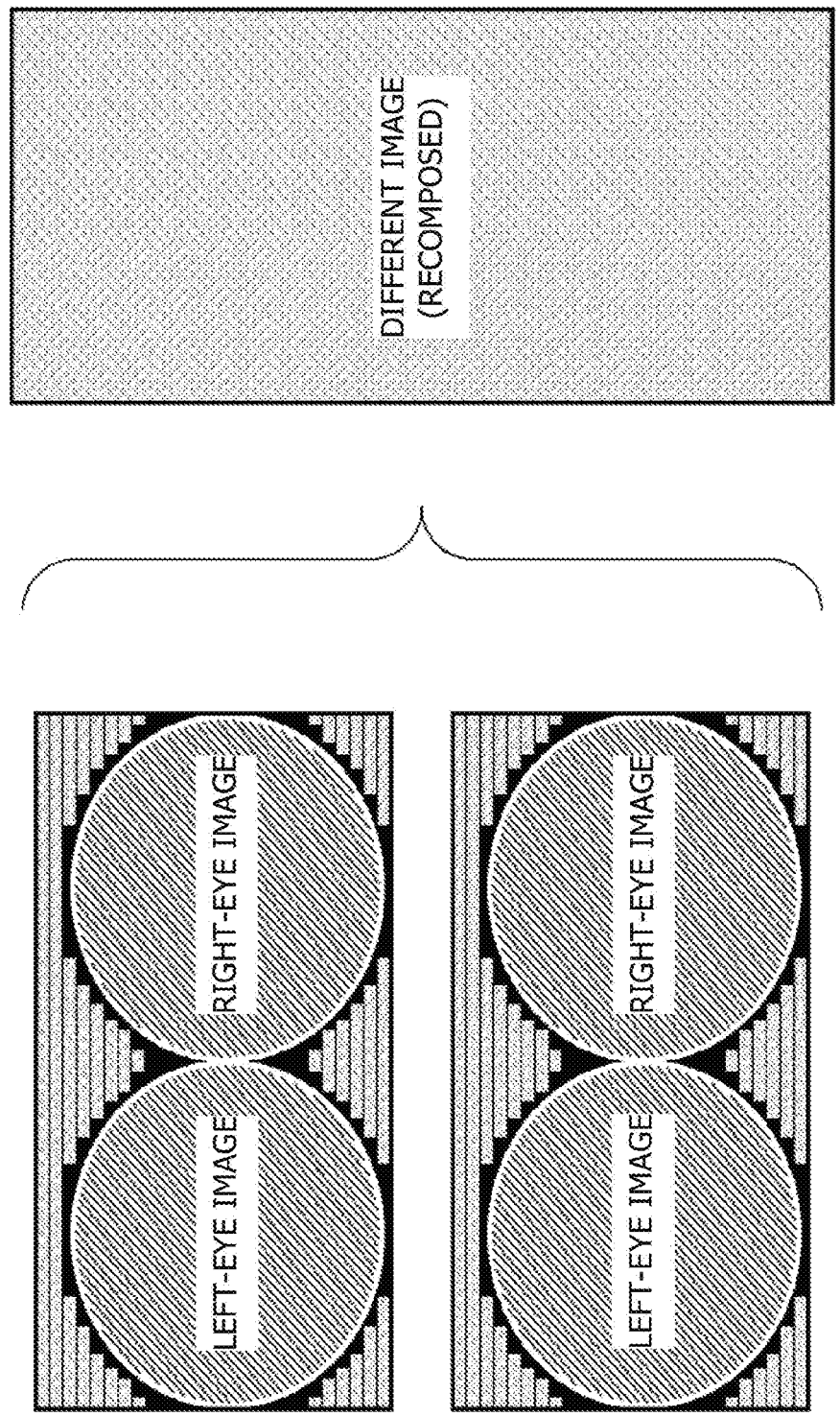
FIG. 15 is a schematic view explanatory of the corresponding relation between the transmission format for the primary image on one hand and a different image on the other hand.

FIG. 15 is a schematic view explanatory of the corresponding relation between the transmission format for the primary image on one hand and a different image on the other hand. In this case, the imagery made up of multiple consecutive primary images is called a "primary video." The primary images constitute individual image frames to be contained in the primary video. Since each different image is transmitted using the unused area of the rectangular image format for transmitting the primary image, multiple consecutive different images can be viewed as a "different video." The primary video and the different video may have the same or different resolutions and the same or different frame rates.

FIG. 15 shows an example in which one different image is embedded with regard to two primary images. In this manner, there is no need for a one-to-one correspondence to exist between the primary image and the different image. One different image may be embedded in the unused area of the rectangular format for transmitting multiple primary images, and the data of the different image may be read from multiple embedded images and recomposed into the different image. In this case, the frame rate of the primary video does not coincide with that of the different video. In the example of FIG. 15, the frame rate of the primary video is twice that of the different video.

Figure 16:
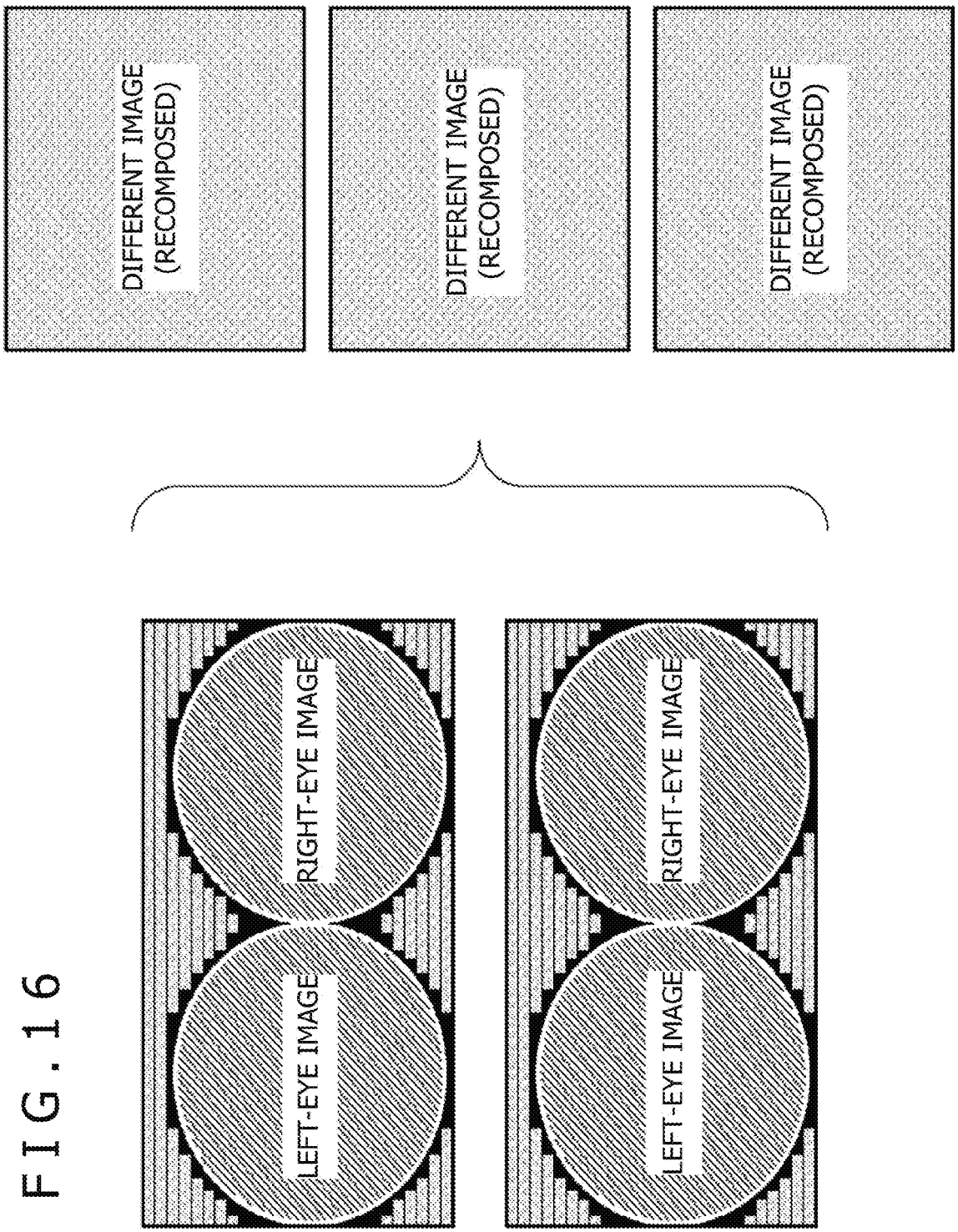
FIG. 16 is another schematic view explanatory of the corresponding relation between the transmission format for primary images on one hand and different images on the other hand.

FIG. 16 is another schematic view explanatory of the corresponding relation between the transmission format for primary images on one hand and different images on the other hand. FIG. 16 shows an example in which three different images are embedded with regard to two primary images. The three different images are recomposed from the two primary images. In this manner, multiple different images may be recomposed either from a single primary image or from multiple primary images. In this case, the timing at which the primary video is refreshed (i.e., the timing at which the next primary image is displayed) is not in synchronism with the timing at which the different video is refreshed (the timing at which the next different image is displayed).

Described below is the format for the different image to be embedded into the unused area.

The different image may have the same data format as the primary image. For example, where the primary image is transmitted using a format in which the colors of red, yellow, and blue are expressed in 8 bits each, the same format is used for the different image to be embedded. Alternatively, the image data may be suitably converted between the primary image and the different image. If the primary image uses 24 bits per pixel, the different image may use 15 bits per pixel. In that case, the remaining 9 bits per pixel may be used as an area for storing the data of other pixels.

The different image may also be in a compression-coded format such as the joint photographic experts group (JPEG) format or the moving picture experts group (MPEG) format.

Some different information may be added to the different image. Typical different information includes audio data, information indicative of the content of the primary image, data for controlling the way the primary image is displayed, information indicative of the content of the different image, data for controlling the way the different image is displayed, data for device control of the head-mounted display 100, information for brightening the screen or for turning or deforming the different image in keeping with the characteristics of the head-mounted display 100, command data for adjusting the focus of the head-mounted display 100, and correction amounts reflecting the real-time attitude information about the head-mounted display 100.

The details of the different image are described below. The different image may be the same as the primary image. Alternatively, the different image may be a primary image not corrected for lens distortion (i.e., original image). As another alternative, the different image may be an image of the outside world captured by a camera so that the outside world can also be viewed by the user wearing the head-mounted display 100. As a further alternative, the different image may be an image of the world viewed through the head-mounted display 100 from a different point of view or from a different angle. As a still further alternative, the different image may be an image for another player battling against or cooperating with the user wearing the head-mounted display 100.

As another alternative, the different image may be a partially hidden primary image. In this case, the player wearing the head-mounted display 100 can view the game image as the primary image while players watching the different image on the external display may be prevented from seeing the core portion of the game.

Other modes of use of the different image are described below. The different image may be displayed on a display apart from the head-mounted display 100. The primary image and the different image may also be displayed on the display apart from the head-mounted display 100.

The different image may be displayed mixed with the primary image on the head-mounted display 100. The different image may also be displayed in place of the primary image on the head-mounted display 100.

The different image may be constituted by data for correcting the primary image, e.g., data that improves the image quality of the primary image when used in additional image processing inside the head-mounted display 100.

The different image received by the head-mounted display 100 may be recorded to a recording device. Alternatively, the different image received by the head-mounted display 100 may be transferred via the network or some other suitable medium to another terminal or another electronic device for other usage. Where "different information" is embedded, that information may be used to control the way the different image is used.

The foregoing description was made on the assumption that because the unused area is outside the field of view of the head-mounted display 100, the whole image having the different image embedded in the unused area is displayed on the head-mounted display 100 without the user seeing the different image embedded in the unused area. However, depending on the characteristics of the head-mounted display 100, part of the different image may intrude into the field of view while the primary image is being viewed. In such a case, the different image may be eliminated by image processing inside the head-mounted display 100. Alternatively, shields may be set up between the panel and the lenses in the head-mounted display 100 or disposed between the lenses and the user's eyes at locations corresponding to the unused area, thereby physically preventing the different image from intruding into the field of view.

According to the present embodiment, the primary image corrected for lens distortion is transmitted to the head-mounted display 100 with a different image or different information embedded in the unused area of the rectangular image format for the primary image so that the different image or the different information may be transferred through effective use of transmission bandwidth. The present embodiment enables diverse applications making use of the different image. In one application, while the user wearing the head-mounted display 100 is viewing the primary image, the different image received by the head-mounted display 100 may be transferred to an external display for other users to watch. In another application, the different image may replace the primary image displayed on the head-mounted display 100. In a further application, the different image may be viewed along with the primary image on the head-mounted display 100.

Also according to the present embodiment, the different image is embedded in the image format for transmitting the primary image, so that the different image is transferred along with the primary image over the same HDMI transmission path. That means there is no need for a communication interface for independently transferring the different image. Because the different image is transferred using the existing communication interface, the configuration of the head-mounted display 100 is simplified.

The present invention has been described based on the embodiment. It is to be understood by those skilled in the art that suitable combinations of constituent elements and processes of the embodiment described above as an example may lead to further variations of the present invention and that such variations also fall within the scope of the present invention. Some of the variations are as follows:

In the above-described embodiment, the communication interface for transmitting the primary and different images is HDMI as an example. In one variation, the communication interface may be DVI. In another variation, wireless communication may be used for the communication between the head-mounted display 100 and the game device 200. In this case, the game device 200 on the transmitting side compression-encodes the primary and different images before image transfer, and the head-mounted display 100 on the receiving side decodes the transferred primary and different images.

REFERENCE SIGNS LIST

10 Control section
20 Input interface
30 Output interface
32 Backlight
40 Communication controlling section
42 Network adapter
44 Antenna
50 Storage section
64 Attitude sensor
70 External input/output terminal interface
72 External memory
80 Clock section
90 HDMI transmitting/receiving section
100 Head-mounted display
110 Body section
120 Forehead contacting section
130 Temple contacting section
200 Game device
700 Image generation device
710 Image storing section
720 Image generating section
730 Lens distortion correcting section
740 Different image acquiring section
750 Different image embedding section
760 HDMI transmitting section
800 Image extraction device
810 HDMI receiving section
820 Memory
830 Different image recomposing section
840 Different image reading section
850 Display outputting section

INDUSTRIAL APPLICABILITY

The present invention can be applied to techniques for transferring images to the head-mounted display.

The invention claimed is:

1. An information extraction device comprising:
a receiving section configured to receive an embedded image having different information embedded in an unused area of a rectangular image format for transmitting a primary image obtained by correcting beforehand an original image in a manner canceling out the distortion thereof that appears when viewed through lenses of a head-mounted display;
a display outputting section configured to output directly to a panel of the head-mounted display the embedded image received by the receiving section; and
a different information recomposing section configured to recompose the different information by extracting the data thereof from the unused area for the embedded image.

2. The information extraction device of claim 1, wherein the different information includes at least one of: audio data, information indicative of a content of the primary image, data for controlling a way the primary image is to be displayed, data for controlling a way the different information is to be displayed, data for device control of the head-mounted display, information for brightening a screen, information for turning or deforming the different information in keeping with characteristics of the head-mounted display, command data for adjusting a focus of the head-mounted display, and correction amounts reflecting a real-time attitude information about the head-mounted display.

3. The information extraction device of claim 1, wherein:
a lens distortion correcting section of an image generation device generates the primary image;
a different information embedding section of the image generation device generates the embedded image;
a transmitting section of the image generation device transfers the embedded image to the head-mounted display; and
the different information is output to the panel of the head-mounted display either in place of, or along with, the primary image.

4. The information extraction device of claim 1, wherein, while holding the embedded image in a memory, the different information recomposing section further writes the recomposed different image back to the memory.

5. The information extraction device according to claim 4, wherein the display outputting section outputs the different information recomposed in the memory to the panel of the head-mounted display either in place of, or along with, the primary image.

6. The information extraction device according to claim 5, wherein the different information is an image captured of the outside world of a user wearing the head-mounted display.

7. The information extraction device according to claim 4, wherein the display outputting section outputs the different information recomposed in the memory to an external display connected to the head-mounted display.

8. The information extraction device according to claim 7, wherein the different information is the original image yet to be corrected in a manner canceling out the distortion thereof.

9. An information extraction method, comprising:
receiving an embedded image having different information embedded in an unused area of a rectangular image format for transmitting a primary image obtained by correcting beforehand an original image in a manner canceling out the distortion thereof that appears when viewed through lenses of a head-mounted display;
outputting directly to a panel of the head-mounted display the embedded image received by the receiving section; and
recomposing the different information by extracting the data thereof from the unused area for the embedded image.

10. The information extraction method of claim 9, wherein the different information includes at least one of: audio data, information indicative of a content of the primary image, data for controlling a way the primary image is to be displayed, data for controlling a way the different information is to be displayed, data for device control of the head-mounted display, information for brightening a screen, information for turning or deforming the different information in keeping with characteristics of the head-mounted display, command data for adjusting a focus of the head-mounted display, and correction amounts reflecting a real-time attitude information about the head-mounted display.

11. The information extraction method of claim 9, further comprising:
generating the primary image;
generating the embedded image; and
transferring the embedded image to the head-mounted display,
wherein the different information is output to the panel of the head-mounted display either in place of, or along with, the primary image.

12. The information extraction method of claim 9, wherein, while holding the embedded image in a memory, writing the recomposed different image back to the memory.

13. The information extraction method according to claim 12, further comprising outputting the different information recomposed in the memory to the panel of the head-mounted display either in place of, or along with, the primary image.

14. The information extraction method according to claim 13, wherein the different information is an image captured of the outside world of a user wearing the head-mounted display.

15. The information extraction method according to claim 12, further comprising outputting the different information recomposed in the memory to an external display connected to the head-mounted display.

16. The information extraction method according to claim 15, wherein the different information is the original image yet to be corrected in a manner canceling out the distortion thereof.

* * * * *